D. T. PARKINSON.
SHAPING PLIERS.
APPLICATION FILED SEPT. 1, 1915.
1,317,385.
Patented Sept. 30, 1919.
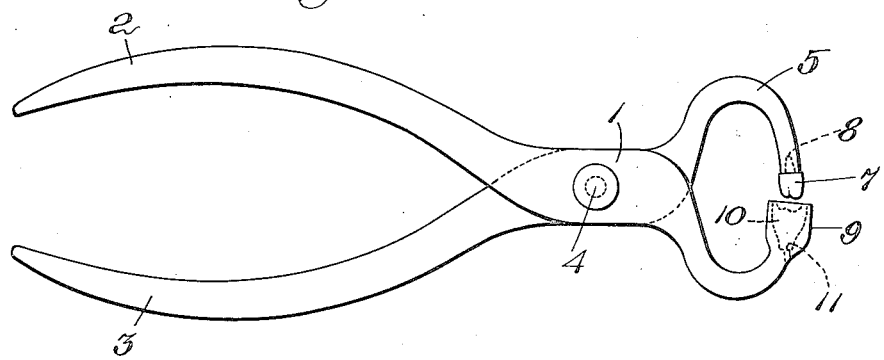
Fig. 1.
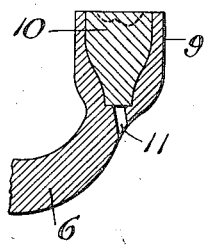 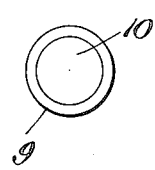 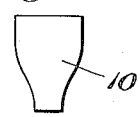
Fig. 2.   Fig. 3.   Fig. 4.
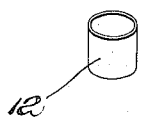 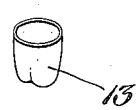
Fig. 5.   Fig. 6.
Inventor:
David T. Parkinson,
by Geo. H. Maxwell,
Attorney.

UNITED STATES PATENT OFFICE.

DAVID T. PARKINSON, OF WICHITA, KANSAS.

SHAPING-PLIERS.

1,317,385.    Specification of Letters Patent.    Patented Sept. 30, 1919.

Application filed September 1, 1915. Serial No. 48,511.

*To all whom it may concern:*

Be it known that I, DAVID T. PARKINSON, a citizen of the United States, and resident of Wichita, in the county of Sedgwick and State of Kansas, have invented an Improvement in Shaping-Pliers, of which the following description, in connection with the accompanying drawings, is a specification, like letters on the drawings representing like parts.

My present invention is an improvement in pliers for use in shaping articles, particularly intended for dentists' work, in shaping tooth crowns and the like. I also have discovered a novel process or method of accurately making coöperating parts of the pliers in exact counter parts, which greatly facilitates the work in shaping tooth crowns, with speed and accuracy.

In carrying out my invention I utilize a shaping die or member of the form desired, and fit the same in one jaw of the pliers. In an opposite jaw I provide a yieldable member, preferably wood, which will receive the other member and form and hold the impression made therein. Thus both upper and lower die members are exact counter parts of each other. In such important and delicate work as that of shaping tooth crowns of gold, platinum or the like, means must be provided which will not mar or injure the blank crown and which also will accurately shape it to the configuration of any particular tooth. I therefore prefer to arrange the yielding or wooden portion to form the outer or exposed surface of the tooth crown, while the coöperating member forces the crown material thereagainst from the inner or concealed face of the crown.

Other objects and features of the invention and important advantages will be hereinafter pointed out and claimed.

Referring to the drawings illustrating a preferred embodiment of my invention, Figure 1 is a side view of my shaping pliers; Fig. 2 is a cross-sectional view, somewhat enlarged, of the die-receiving part of the pliers; Fig. 3 is a plan view of the part shown in Fig. 2; Fig. 4 is a view of the wooden plug utilized; Fig. 5 is a perspective view of a blank tooth crown before operated upon and Fig. 6 is a view of the same completed by my pliers and process.

While my invention is primarily intended for dentists' work and is therefore illustrated as embodied in shaping pliers for such use, it is to be understood that I am not limited to this form, but that the invention may be utilized in other fields.

As shown in the drawings the shaping pliers 1 comprise the handle members 2 and 3 pivoted at 4 and with jaws 5 and 6. The jaws 5 and 6 are preferably so formed as to enable a blank tooth crown to be readily fitted therebetween, and to this end are curved substantially as shown in Fig. 1. The upper jaw 5 is fitted with the die 7 by means of a taper stud 8 as shown in dotted lines, or in any other suitable manner, said die being preferably of metal and of the proper configuration for forming a tooth crown. In fact it is feasible to make use of a particular tooth, fitting the same with a stud to the pliers in place of the die member 7 if so desired. The lower jaw 6 is formed with an open socket portion 9 as shown in Fig. 2, which is formed to receive the wooden plug 10. Such plug is preferably of orange wood or an equivalent material, which will readily receive the imprint of the die member 7 and hold the same. I find that orange wood is of ample strength to accurately coöperate with the die 7 to shape the crown therebetween. The plug 10 may be tapered or other wise formed to be wedged within the socket porton 9 of the lower jaw so that it will be held therein firmly and not be displaced by the action either of the die 7 while forming its impression therein or while shaping a blank crown. To facilitate the removal of the wooden plug 10 I may provide a recess or aperture 11 through which an instrument may be forced to remove the wooden plug 10 when it is desired to supply a new plug for another or different impression.

In operating the pliers I fit the die 7 and plug 10 in the respective jaws of the pliers, then compress the pliers to form in the plug 10 the counter part of the die 7. A blank crown 12 is then positioned between the pliers and the crown is swaged, formed or worked into the desired shape as illustrated at 13. The yielding or wooden member 10 will not mar the outer surface of a gold crown, but in fact serves to impart a finish or polish thereto during the shaping action. The speed and rapidity with which tooth crowns may thus be formed and the exactness will be apparent to those skilled in the art, and the value of having the die member 7 always register with its coöperating member 10 will also be appreciated. I may, of course, utilize the die 7 and yielding member 10 as male and female die parts respectively, or in reverse position, if desired, forming the socket member 10 as the rigid part and shaping the coöperating member 7 therefrom. In dental work, however, I prefer to have the socket member 10 as the outer crown acting die for the purpose of preventing the crown surface from being marred, scratched, or the like, as already explained.

My invention is further described and defined in the form of claims as follows:

1. Shaping pliers of the kind described, for use in forming dental crowns, having means to receive a removable shaping member in one jaw and having a socket in the other jaw adapted to receive a coöperating detachable yielding member and said socket provided with an aperture in its lower part through which to drive out the yielding member, said yielding member being a block of wood adapted to the socket and sufficiently soft to receive an impression from said shaping member and sufficiently hard to conform the work to said impression made therein.

2. Shaping devices of the kind described for use in forming dental crowns comprising two members hinged together, one of said members provided with a removable shaping tool and the other member provided with a tapered socket having a coöperating detachable yielding member said socket having a small opening through its bottom wall and at the small end of the socket through which the yielding member may be driven out of the socket, said yielding member comprising a tapered block of wood detachable from the socket and whose fibers extend lengthwise of the block so as to receive impression on their ends, said wood sufficiently soft to receive an impression from said shaping tool and sufficiently hard to conform the work to said impression made therein.

In testimony whereof, I have signed my name to this specification, in the presence of two subscribing witnesses.

DAVID T. PARKINSON.

Witnesses:
W. A. CLEMENTS,
WM. HATFIELD.